(12) United States Patent
Xu et al.

(10) Patent No.: US 7,944,856 B2
(45) Date of Patent: May 17, 2011

(54) METHOD AND APPARATUS FOR PROVIDING REDUNDANCY FOR AN ACCESS NETWORK

(75) Inventors: Dahai Xu, Livingston, NJ (US); Elliot Anshelevich, Troy, NY (US); Mung Chiang, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 175 days.

(21) Appl. No.: 12/343,133

(22) Filed: Dec. 23, 2008

(65) Prior Publication Data

US 2010/0157847 A1 Jun. 24, 2010

(51) Int. Cl.
*H04L 12/44* (2006.01)
(52) U.S. Cl. ......... 370/254; 370/411; 709/221; 709/252
(58) Field of Classification Search .................. 370/254, 370/255, 400, 401, 411; 709/220, 221, 248, 709/252
See application file for complete search history.

(56) References Cited

U.S. PATENT DOCUMENTS

| 5,533,016 | A | * | 7/1996 | Cook et al. | 370/351 |
|---|---|---|---|---|---|
| 6,047,331 | A | * | 4/2000 | Medard et al. | 709/239 |
| 6,728,205 | B1 | * | 4/2004 | Finn et al. | 370/217 |
| 6,804,634 | B1 | * | 10/2004 | Holzmann et al. | 703/2 |
| 2006/0002291 | A1 | * | 1/2006 | Alicherry et al. | 370/225 |
| 2007/0177518 | A1 | * | 8/2007 | Li et al. | 370/252 |
| 2009/0187876 | A1 | * | 7/2009 | Su et al. | 716/19 |
| 2010/0142408 | A1 | * | 6/2010 | Hajiaghayi | 370/255 |

* cited by examiner

*Primary Examiner* — Pankaj Kumar
*Assistant Examiner* — Duc T Duong

(57) ABSTRACT

A method and apparatus for providing redundancy for an access network are disclosed. For example, the method receives an access network structure, and removes one or more unnecessary 2D edges or 3D edges from a simplex cover for the access network structure. The method then performs a search on the simplex cover; and, generates a new access network structure that includes the redundancy.

20 Claims, 5 Drawing Sheets

200

(b)

400

(a)

300

METHOD AND APPARATUS FOR PROVIDING REDUNDANCY FOR AN ACCESS NETWORK

The present invention relates generally to communication networks and, more particularly, to a method and apparatus for providing redundancy for an existing access network.

BACKGROUND OF THE INVENTION

A typical access network has a structure like a "fat tree" where each terminal relays traffic towards customer endpoint devices from another terminal of the same or higher level. For example, terminals located closer to a core backbone network carry traffic to/from more customers as compared to terminals located closer to customer locations. This is because traffic to/from a large number of customers is aggregated for the purpose of sharing the network metro and core infrastructures.

With economic constraints and limited routing capabilities in the access networks, network service providers have developed redundant network designs only for core and metro portions of the network infrastructure. For example, the core and metro portions of the network infrastructure may include mesh or ring network topologies for increased survivability. However, the traffic volume in the access networks continues to grow. For example, customers are using the internet for ever increasing amount of voice, data and video traffic. The lack of redundancy in the access network may become a bottleneck for improving the end-to-end survivability.

SUMMARY OF THE INVENTION

In one embodiment, the present invention provides a method and an apparatus for providing redundancy for an access network. For example, the method receives an access network structure, and removes one or more unnecessary 2D edges or 3D edges from a simplex cover for the access network structure. The method then performs a search on the simplex cover; and, generates a new access network structure that includes the redundancy.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing redundancy for an existing access network. Although the present invention is discussed below in the context of access networks, the present invention is not so limited. Namely, the present invention can be applied to other networks with a tree structure.

Figure 1:
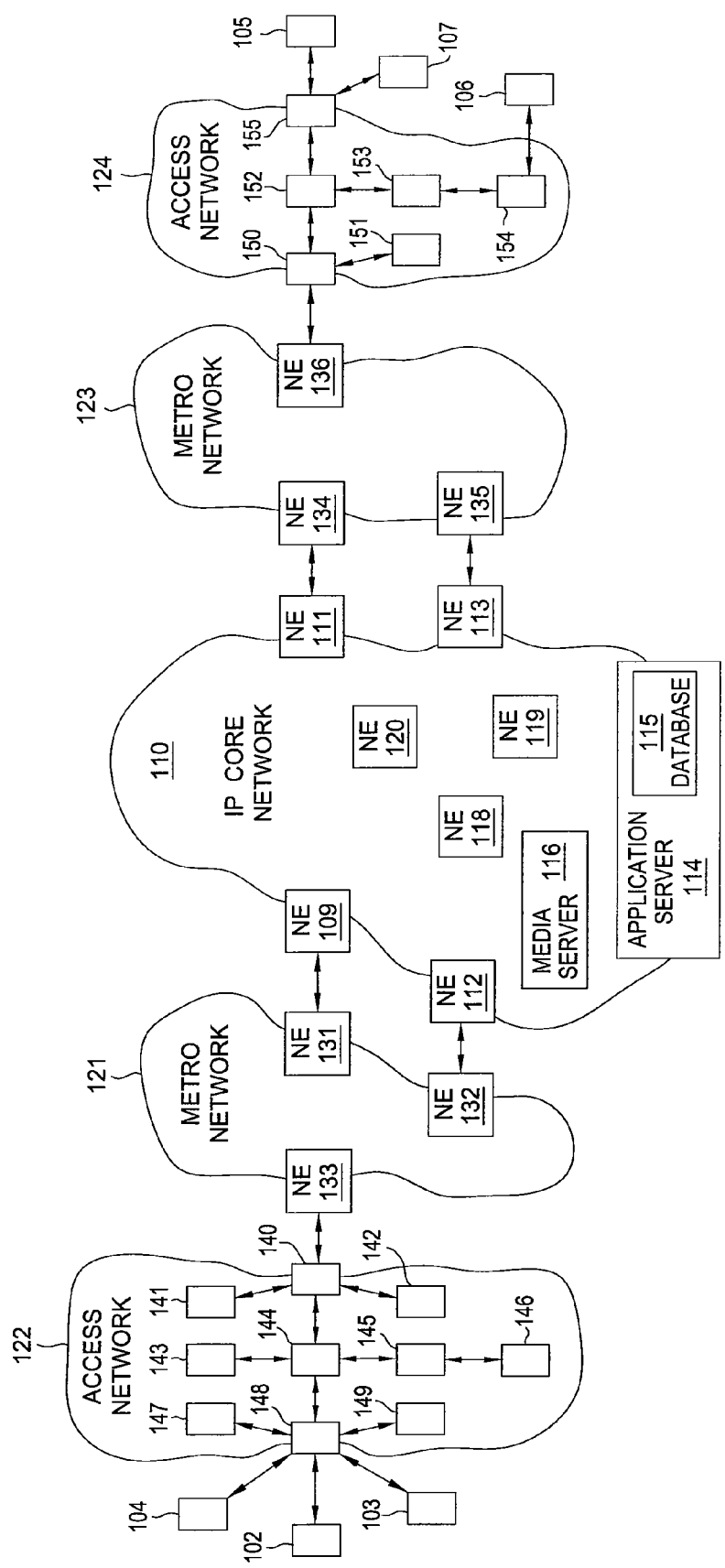
FIG. 1 illustrates an exemplary network related to the present invention.

To better understand the present invention, FIG. 1 illustrates an example network 100, e.g., an Internet Protocol (IP) network related to the present invention. An IP network is broadly defined as a network that uses Internet Protocol to exchange data packets. Exemplary IP networks include Voice over Internet Protocol (VoIP) networks, Service over Internet Protocol (SoIP) networks, Internet Protocol (IP) Multimedia Subsystem (IMS) networks and the like.

In one embodiment, the network 100 may comprise a plurality of endpoint devices 102-104 configured for communication with a core IP network 110 (e.g., an IP based core backbone network supported by a service provider) via a metro network 121 and an access network 122. Similarly, a plurality of endpoint devices 105-107 are configured for communication with the IP core packet network 110 via a metro network 123 and an access network 124.

The network elements 109-113 may serve as gateway servers or edge routers for the network 110. The metro network 121 comprises the network elements 131-133 and the metro network 123 comprises the network elements 134-136. In one example, the IP core network may have a mesh network topology and the metro networks 121 and 123 may have a ring network topology. For example, each of the metro networks 121 and 123 may be connected to the IP core network 110 via two separate network elements for improved availability. Specifically, network element 131 may be connected to network element 109, network element 132 may be connected to network element 112, network element 134 may be connected to network element 111, and network element 135 may be connected to network element 113.

The access networks 122 and 124 may comprise network elements 140-149 and 150-155, respectively. Network elements 140-149 and 150-155 may each be configured in a tree type network topology for reaching IP customer endpoint devices, e.g., customer endpoint devices 102-107. Namely, the access networks 122 and 124 serve as a means to establish a connection between the endpoint devices 102-107 and the Network Elements (NEs) 109-113 of the IP core network 110 through a metro network 121 or 123. The endpoint devices 102-107 may comprise customer endpoint devices such as personal computers, laptop computers, Personal Digital Assistants (PDAs), and the like.

Some NEs (e.g., NEs 109-113) reside at the edge of the IP core infrastructure and interface with customer endpoints over various types of access and metro networks. An NE that resides at the edge of a core infrastructure is typically implemented as an edge router, a media gateway, a proxy, a border element, a firewall, a switch, and the like. An NE may also reside within the network (e.g., NEs 118-120) and may be used as a SIP server, a core router, or like device. The IP core network 110 may also comprise a media server 116, and an Application Server 114 (e.g., a VoIP server and the like) that contains a database 115.

The Media Server (MS) 116 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 114 may comprise any server or computer that is well known in the art, and the database 115 may be any type of electronic collection of data that is also well known in the art. Those skilled in the art will realize that the communication system 100 may be expanded by including additional endpoint devices, access networks, metro networks, network elements, application servers, etc. without altering the scope of the present invention.

The above IP network is described to provide an illustrative environment in which packets for voice, data and multimedia services are transmitted on IP networks. An access network is designed for enabling connectivity between customer endpoint devices and the service provider's metro and/or core networks. Since the customer locations are physically distributed, providing ring or mesh topology for access networks is cost prohibitive. Hence, access networks have lower survivability as compared to metro and/or core networks. However, more and more customers are utilizing the access networks for all of their voice, data and multimedia traffic. Therefore, a service provider may wish to improve the survivability of the access network by providing redundancy. In one embodiment, the current method provides redundancy for existing access networks. In order to clearly describe the current method, the following network terminologies are first provided.

Terminal node refers to a required node in a network. For example, if a customer endpoint device is able to be connected to the service provider's network only through a single gateway router, then that gateway router is deemed to be a required node. The required node may then be referred to as a terminal node.

Steiner node refers to an optional node in a network. For example, if a customer endpoint device is able to be connected to the service provider's network through a choice of 20 gateway routers, then each of the gateway routers is deemed to be an optional node. The optional node in a network may then be referred to as a Steiner node.

An edge cover refers to a Min-cost subset of edges to cover every node.

A perfect matching refers to a Min-cost subset of edges where each node is met exactly by one edge.

A Steiner tree refers to a Min-cost tree structure containing all the terminal nodes and any subset of the Steiner nodes.

A simplex condition refers to a condition in which for every 3-dimensional (3D) edge (x,y,z), the corresponding 2-dimensional (2D) edges (x,y), (y,z) and (x,z) also exist and their respective weights satisfy the inequality $w_{(x,y,z)} \geq (w_{x,y}+w_{y,z}+w_{x,z})/2$.

A simplex cover refers to a Min-cost edge cover in a hypergraph with simplex condition.

A simplex matching refers to a perfect matching in a hypergraph with a simplex condition.

A terminal backup problem refers to a problem wherein, given a network graph with terminal (required) nodes, Steiner (optional) nodes and weighted edges, the goal is to find the cheapest sub-graph so that every terminal node is connected to at least one other terminal node for backup purposes by using Steiner nodes.

Terminal backup refers to a Min-cost sub-graph where every terminal node is connected to at least one other terminal node using one or more Steiner nodes. That is, in an optimal solution of a terminal backup problem, there cannot be an edge in a sub-graph that its removal yields a feasible solution. Hence, removing any edge of the terminal backup will cut-off exactly one terminal node from the rest and therefore all connected components of the terminal backup are stars. Moreover, each star may further be decomposed into stars containing either 2 or 3 terminal nodes.

The terminal backup problem may then be mathematically formulated as a problem that creates a hypergraph H(G) from an instance G of the terminal backup problem, wherein the H(G) contains 2D and 3D edges. Specifically, the largest size of the edges is three.

In order to create the hypergraph H(G), the method first creates a node for every terminal. For every terminal pair, x, y, the method then finds the shortest path (minimum cost path) P joining the two terminals in G. The method then creates an edge $(x,y) \in H(G)$ with weight $w_{x,y}=$cos t(P). For every triple of terminals, x, y, z, the method then finds the shortest paths $P_1$, $P_2$, $P_3$ connecting the triple of terminals to a Steiner point. The method then creates a 3D edge $(x,y,z) \in H(G)$ with weight $w_{x,y,z}=$cos t($P_1$)+cos t($P_2$)+cos t($P_3$). Note that H(G) does not contain any Steiner nodes and satisfies the simplex condition. This is because the shortest paths in G satisfy the triangular inequality $w_{(x,y,z)} \geq (w_{x,y}+w_{y,z}+w_{x,z})/2$ provided above. The simplex cover may then be formulated as a problem of finding the minimum cost edge cover in a hypergraph obeying the simplex condition, i.e., covering every node with a 2D or 3D edge. The minimum cost simplex cover in H(G) corresponds to the optimal solution of the terminal backup problem in G. Hence, the terminal backup problem and the simplex cover problem are equivalent.

In one embodiment, the current method provides an algorithm for solving the simplex cover problem. Note that one may assume that the weight of any 3D edge is less than the sum cost of any two corresponding 2D edges, since otherwise one would not use the 3D edge in a cover and may eliminate the inefficient 3D edge in advance.

In one embodiment, the algorithm for solving the simplex cover problem may be an algorithm that first transforms the problem to a weighted simplex matching problem. For example, the method may use simplex matching to solve simplex cover by converting the cover version of the problem to a matching version.

Figure 2:
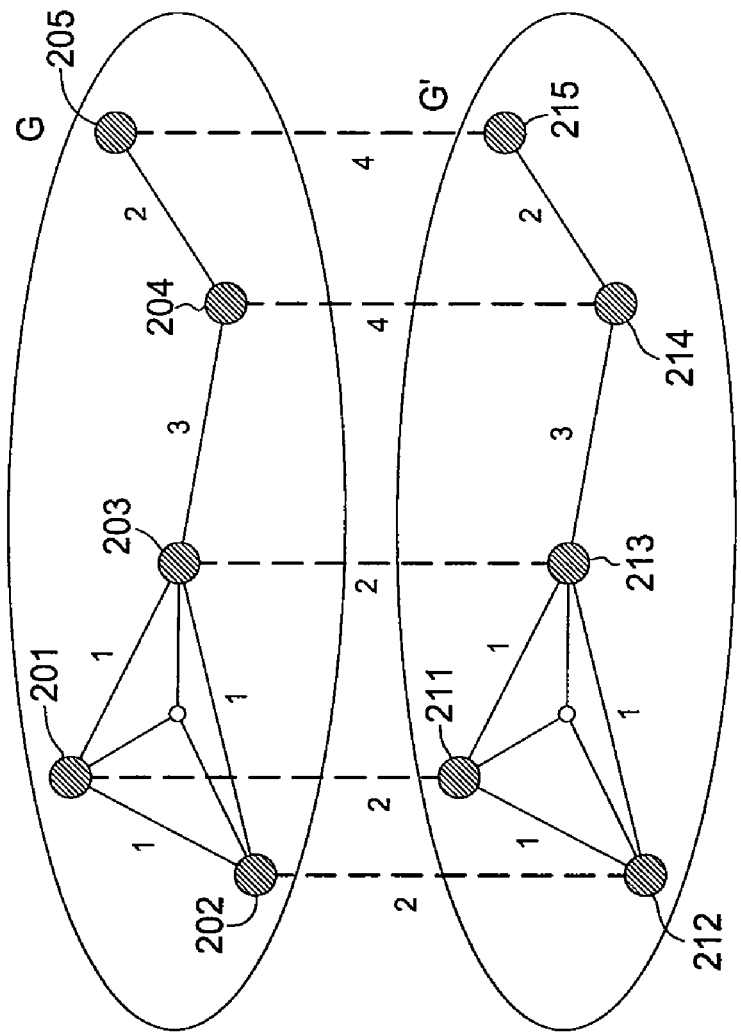
FIG. 2 provides a network that illustrates transforming a simplex cover problem to a perfect simplex matching problem.

FIG. 2 provides a network 200 that illustrates transforming a simplex cover problem to a perfect simplex matching problem. The network 200 comprises a graph Q generated as follows from a network G. The method first makes another copy of G, called G'. For every node v in G (nodes 201-205), there is a corresponding node v' in G'(nodes 211-215). The method then forms an edge (v,v') with weight $2 \times \min_{(v,w) \in E_2} w_{v,w}$, wherein $E_2$ is the set of 2D edges in G. The minimum cost simplex cover may then be found by solving the instance of weighted simplex matching problem of graph Q.

Table 1 provides an illustrative algorithm for providing weighted simplex matching. $\Phi$ represents the set of selected 3D edges. $\delta$ is used to keep the minimum matching cost found so far, and the function MinMatching ($\Phi$) returns the cost of the 3D edges in $\Phi$ plus the minimum cost regular perfect matching in the residual graph after removing all the nodes adjacent to the 3D edges in $\Phi$. The trigger operation is either removing a 3D edge from $\Phi$ or adding an unused 3D edge into $\Phi$. The algorithm in Table 1 is solvable in polynomial time. This may be time and resource intensive for networks in which the number of 3D edges may be large.

TABLE 1

| | |
|---|---|
| 1: | Start with any perfect simplex matching which uses the set $\Phi$ of 3D edges. |
| 2: | $\delta \leftarrow$ MinMatching ($\Phi$) |
| 3: | repeat |
| 4: | $\Phi' \leftarrow \Phi; \delta_0 \leftarrow \delta$ |
| 5: | for each $\Phi'$ resulting from a pair of trigger operations for $\Phi$ do |
| 6: | $\delta' \leftarrow$ MinMatching ($\Phi'$) |
| 7: | if $\delta > \delta'$ then |
| 8: | $\delta \leftarrow \delta'; \Phi \leftarrow \Phi'$ |

TABLE 1-continued

```
9:       continue for breadth-first search or break for
         depth-first search
10:     end if
11:   end for
12: until δ = δ₀/*no further improvement*/
13. return δ,Φ
```

In another embodiment, the algorithm solves the simplex cover problem directly by making use of the special properties of the simplex cover itself, i.e., without transforming the problem to the weighted simplex matching problem. For example, some 2D and 3D edges may never be included in an optimal simplex cover. The method may then first remove unnecessary 2D and 3D edges from the simplex cover, resulting in a sparse version of the simplex cover.

Figure 3:
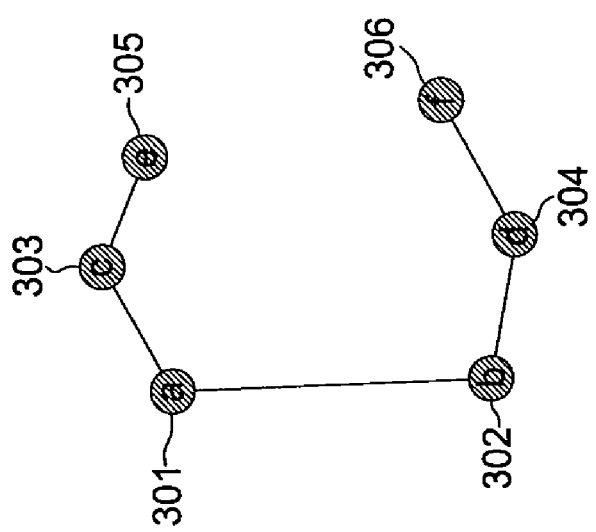
FIG. 3 provides a network that illustrates removal of unnecessary 2D edges.

FIG. 3 provides a network 300 that illustrates the removal of unnecessary 2D edges. Network 300 comprises an access network with nodes 301-306, corresponding to terminals a through f. For terminal a (node 301), the closest neighbor is denoted by γ(a) and the closest neighbor distance is denoted by $\hat{w}_a$, wherein $$\hat{w}_a = w_{a,\gamma(a)} = \min_{(a,i) \in E_2} w_{a,i}$$

and $E_2$ is the set of edges. For the example illustrated in FIG. 3, c (node 303) and d (node 304) are the closest neighbor nodes for a (node 301) and b (node 302), respectively. If $w_{a,b} \geq \hat{w}_a + \hat{w}_b = w_{a,c} + w_{b,d}$, then 2D edge (a,b) can be removed from the graph, since covering nodes a and b with one 2D edge (a,b) is worse than covering them with two 2D edges (a,c) and (b,d). It should be realized that such removal is not always legitimate for the perfect matching problem. In FIG. 3, the instances of perfect matching are {(a,b),(c,e),(d,f)}.

Figure 4:
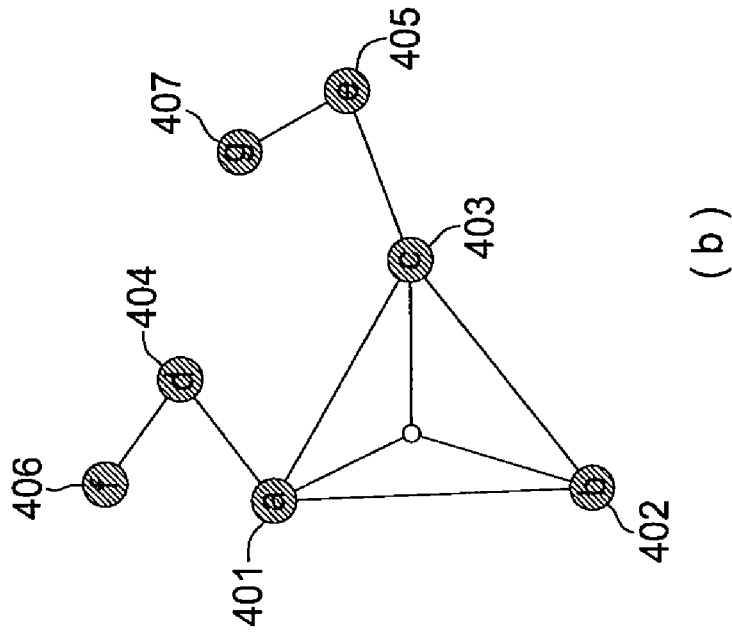
FIG. 4 provides a network that illustrates removal of unnecessary 3D edges.

FIG. 4 provides a network 400 that illustrates removal of unnecessary 3D edges. Network 400 comprises nodes 401-407, corresponding to terminals a through g. A 3D edge may be removed from an instance of a simplex cover if its weight is larger than the sum of the weights of a 2D edge between its two nodes and the closes neighbor distance of the third node. For example, in FIG. 4, if $w_{a,b,c} \geq \hat{w}_{a,b} + \hat{w}_c = w_{a,b} + w_{c,e}$, then covering nodes a, b and c with a 3D edge (a,b,c) is not as good as using two 2D edges (a,b) and (c,e). Again it should be realized that such removal is not always possible due to perfect matching. In FIG. 4, the instances of simplex perfect matching are {(a,b,c),(d,f),(e,g)}.

Table-2 provides an illustrative algorithm for solving the simplex cover problem directly. The function MinCover(Φ) returns the sum of the weights of the 3D edges in Φ plus the minimum cost regular edge cover in the residual graph after removing all the nodes adjacent to 3D edges in Φ. The '+' and '−' signs are used to denote adding an unused 3D edge into Φ and removing a 3D edge from Φ, respectively. The legitimate trigger operations may then be limited to '+', '++', '−+', '−' and '−−'. Note that '++', '−+' and '−−' refer to two simultaneous trigger operations, which cannot be replaced with two sequential single trigger operations.

TABLE 2

```
1:   Φ ← ∅
2:   δ ← MinCover(Φ)/*Start with the min-cost regular
     edge cover (without using any 3D edges)*/
3:   repeat
```

TABLE 2-continued

```
4:       Φ' ← Φ;δ₀ ← δ
5:       for each Φ' resulting from legitimate trigger
         operations for Φ do
6:           δ' ← MinCover (Φ')
7:           if δ > δ' then
8:               δ ← δ';Φ ← Φ'
9:               continue for breadth-first search or break for
                 depth-first search
10:          end if
11:      end for
12:  until δ = δ₀/*no further improvement*/
13.  return δ,Φ
```

In one embodiment, the above algorithm removes unnecessary 2D and 3D edges from a simplex cover and provides a sparser simplex cover. However, the more 3D edges a connected component has, the longer the search time. In addition, unlike a 2D edge, once a 3D edge is chosen for a simplex cover, its three nodes cannot be covered by any other edges. Otherwise, it would be better to use one of the 2D sub-edges instead of the 3D edge.

In one embodiment, the current method provides a search policy that decomposes a large connected component as quickly as possible. The method provides a priority based depth first search policy. The depth first aspect is described below. The priority refers to a hierarchy of the legitimate trigger operations described above.

For example, a '+' operation could decompose a connected component C into up to three connected components by adding an unused 3D edge. The three smaller connected components may be addressed separately. Similarly, a '−' operation may reunite up to three connected components to recover one larger connected component. Hence, the '+' operation may be granted higher priority than the '−' operation.

In another example, if there are m' 3D edges in a connected component, before searching for an improvement, the method may consider m' '+' operations, and $$\binom{m'}{2}$$

'++' operations. In other words, the '+' operation may be granted higher priority than the '++' operation, such that the '+' operation may decompose the connected components before the '++' operation. The current method uses a hierarchy of priority of operations listed from highest priority to lowest priority as follows: '+' (highest priority), '++', '−+', '−' and '−−' (lowest priority).

In the above search policy, one may perform updates after all legitimate operations have been tried (breadth first search policy) or update when an improvement has been found (depth first search policy). In one embodiment, the current method uses a depth first search policy since the connected components may be decomposed earlier.

The current method utilizes the depth first search policy with a resume operation. For example, for the '+' operation, assume the 3D edges within a connected component are represented with an order, such as $e_1, e_2, \ldots, e_i, \ldots$. If '+' $e_i$ brings an improvement, the depth first search may update Φ by adding $e_i$. The method may then restart the search from $e_{i+1}$ (i.e. resume) instead of from $e_1$ (i.e. reset), since $e_1$ has been tried before without yielding an improvement. When the algorithm is complete, the method may then output the resulting solution of the simplex cover problem as the optimal access network structure.

Figure 5:
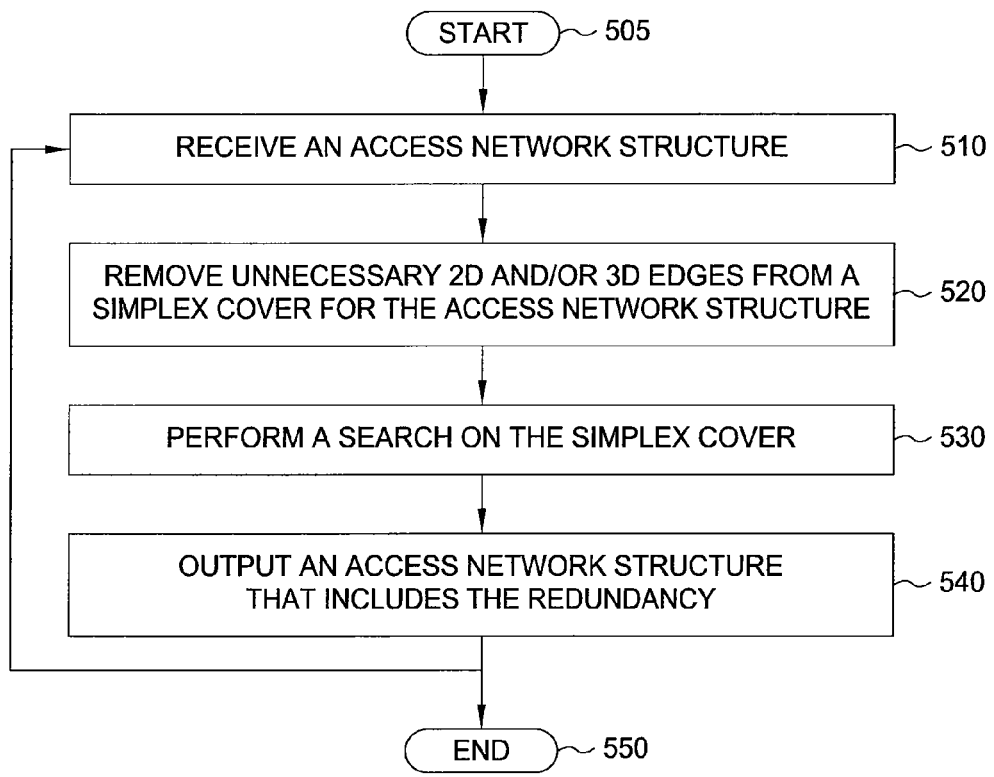
FIG. 5 illustrates a flowchart of a method for providing redundancy for an existing access network.

FIG. 5 illustrates a flowchart of a method 500 for providing redundancy for an access network. For example, one or more steps of method 500 can be implemented by an application server. Method 500 starts with step 505 and proceeds to step 510.

In step 510, method 500 receives an access network structure. For example, the method may receive an access network structure that provides all terminals communicating with a central office either directly or through a remote terminal. The method may then formulate a plan or a solution for providing redundancy as a minimum cost simplex cover problem, i.e., a problem of searching for a minimum cost solution of covering every node with a 2D or 3D edge.

In step 520, method 500 removes unnecessary 2D and/or 3D edges from a simplex cover for the access network structure. For example, some 2D and 3D edges may never be included in an optimal simplex cover. The method may then first remove the unnecessary 2D and 3D edges to obtain a sparser version of the simplex cover.

In step 530, method 500 performs a search on the simplex cover. For example, the method may perform a priority based depth first search by sequentially performing legitimate operations (e.g., adding a 3D edge, removing a 3D edge, etc.), performing updates when an improvement is found, and resuming the search until an optimal simplex cover is found. For example, redundancy may be achieved for all terminals at a cost target set by the network operator. For example, the cost for providing redundancy may reach the minimum and an improvement may no longer be achieved by running the algorithm further.

In one embodiment, the priority provides a hierarchy of legitimate operations. In one embodiment, the hierarchy of legitimate operations listed from highest priority to lowest priority is: '+', '++', '−+', '−' and '−−', wherein '+' is an operation that adds an unused 3D edge, '−' is an operation that removes a 3D edge, and '++', '−+' and '−−' are two simultaneous operations which cannot be replaced with two sequential single operations.

In step 540, method 500 outputs or generates a new access network structure that includes the redundancy for the access network structure that was received in step 510. For example, the method may output the resulting solution of the simplex cover problem as the optimal access network structure for providing redundancy. The method then ends in step 550 or returns to step 510 to continue receiving more access network structures for evaluation.

It should be noted that although not specifically specified, one or more steps of method 500 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 5 that recite a determining operation or involve a decision, do not necessarily require that both branches of the determining operation be practiced. In other words, one of the branches of the determining operation can be deemed as an optional step.

Figure 6:
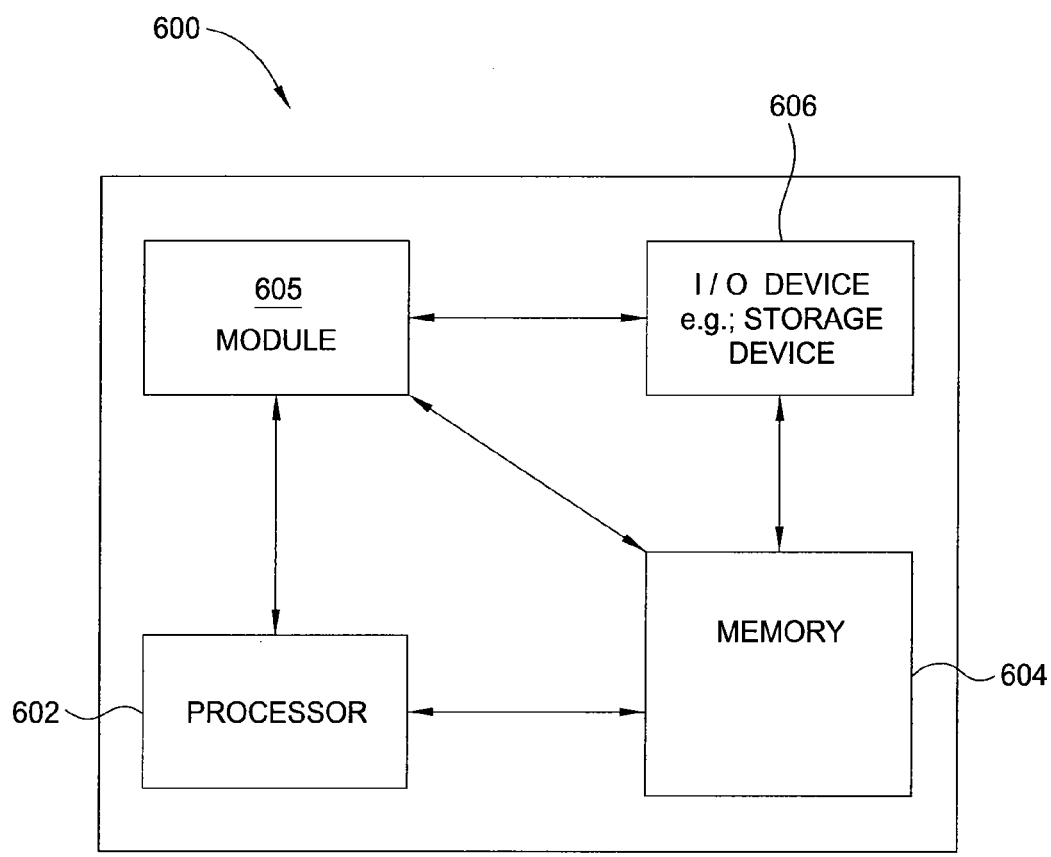
FIG. 6 illustrates a high level block diagram of a general purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing redundancy for an access network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing redundancy for an access network can be loaded into memory 604 and executed by processor 602 to implement the functions as discussed above. As such, the present method 605 for providing redundancy for an access network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing redundancy for an access network, comprising:
   receiving an access network structure;
   removing an unnecessary three-dimensional edge from a simplex cover for the access network structure;
   performing a search on the simplex cover, wherein the search is performed by a processor; and
   generating a new access network structure that includes the redundancy.

2. The method of claim 1, wherein the search comprises a priority based search.

3. The method of claim 2, wherein the priority based search provides a hierarchy of legitimate operations.

4. The method of claim 3, wherein the hierarchy of legitimate operations listed from a highest priority to a lowest priority comprise: '+', '++', '−+', '−' and '−−', wherein '+' is an operation that adds an unused three-dimensional edge, '−' is an operation that removes a three-dimensional edge, and '++', '−+' and '−−' are two simultaneous operations which cannot be replaced with two sequential single operations.

5. The method of claim 1, wherein the search comprises a depth first search.

6. The method of claim 1, wherein the search comprises a priority based depth first search.

7. The method of claim 1, wherein the search comprises a breadth first search.

8. A non-transitory computer-readable medium having stored thereon a plurality of instructions, the plurality of instructions including instructions which, when executed by a processor, cause the processor to perform a method for providing redundancy for an access network, comprising:
   receiving an access network structure;
   removing an unnecessary three-dimensional edge from a simplex cover for the access network structure;
   performing a search on the simplex cover; and
   generating a new access network structure that includes the redundancy.

9. The non-transitory computer-readable medium of claim 8, wherein the search comprises a priority based search.

10. The non-transitory computer-readable medium of claim 9, wherein the priority based search provides a hierarchy of legitimate operations.

11. The non-transitory computer-readable medium of claim 10, wherein the hierarchy of legitimate operations listed from a highest priority to a lowest priority comprise: '+', '++', '−+', '−' and '−−' wherein '+' is an operation that adds an unused three-dimensional edge, '−' is an operation that removes a three-dimensional edge, and '++', '−+' and '−−' are two simultaneous operations which cannot be replaced with two sequential single operations.

12. The non-transitory computer-readable medium of claim 8, wherein the search comprises a depth first search.

13. The non-transitory computer-readable medium of claim 8, wherein the search comprises a priority based depth first search.

14. The non-transitory computer-readable medium of claim 8, wherein the search comprises a breadth first search.

15. An apparatus for providing redundancy for an access network, comprising:
 means for receiving an access network structure;
 means for removing an unnecessary three-dimensional edge from a simplex cover for the access network structure;
 means for performing a search on the simplex cover; and
 means for generating a new access network structure that includes the redundancy.

16. The apparatus of claim 15, wherein the search comprises a priority based search.

17. The apparatus of claim 16, wherein the priority based search provides a hierarchy of legitimate operations.

18. The apparatus of claim 17, wherein the hierarchy of legitimate operations listed from a highest priority to a lowest priority comprise: '+', '++', '−+', '−' and '−−', wherein '+' is an operation that adds an unused three-dimensional edge, '−' is an operation that removes a three-dimensional edge, and '++', '−+' and '−−' are two simultaneous operations which cannot be replaced with two sequential single operations.

19. The apparatus of claim 15, wherein the search comprises a depth first search.

20. The apparatus of claim 15, wherein the search comprises a breadth first search.

* * * * *